United States Patent [19]
Ragsdale

[11] Patent Number: 5,642,971
[45] Date of Patent: Jul. 1, 1997

[54] RAIL SYSTEM FOR PICK-UP TRUCK BEDS

[76] Inventor: Hans L. Ragsdale, 516 Elaine Dr., Nashville, Tenn. 37204

[21] Appl. No.: 522,731

[22] Filed: Sep. 1, 1995

[51] Int. Cl.$^6$ ........................................ B60P 7/06
[52] U.S. Cl. ........................ 410/106; 410/101; 296/36; 296/43
[58] Field of Search ................... 410/101, 102, 410/106, 107–110; 296/32, 36, 39.2, 41, 43

[56] References Cited

U.S. PATENT DOCUMENTS

| | | | |
|---|---|---|---|
| 1,596,795 | 8/1926 | Blakeney | 296/36 |
| 4,138,046 | 2/1979 | De Freze | 296/43 |
| 4,381,123 | 4/1983 | Anderson | 296/43 |
| 4,396,324 | 8/1983 | Ellis | 410/101 |
| 4,604,013 | 8/1986 | Elwell et al. | 410/106 |
| 4,650,382 | 3/1987 | Johnson | 410/110 |
| 4,872,719 | 10/1989 | Cardwell | 296/34 |
| 4,958,875 | 9/1990 | Zamzow | 296/36 |
| 5,253,918 | 10/1993 | Wood et al. | 296/32 |

*Primary Examiner*—Karen B. Merritt
*Assistant Examiner*—Gregory A. Morse
*Attorney, Agent, or Firm*—I. C. Waddey, Jr.; Waddey & Patterson

[57] ABSTRACT

A truck bed railing system including a bracket with depending legs with holes in the legs so that the brackets may be attached to the top of the rear side panel of a truck bed with screws. The top of said bracket has a U-shaped profile to mate with standard PVC pipe with the pipe serving as the bed rails. A metal sleeve fits in the cradle of the bracket. The sleeve is a hollow cylinder that holds the PVC pipe securely against the U-shaped upper portion of the bracket. Once the PVC pipe has been threaded through the sleeve, it is anchored with a screw passing through the sleeve, the pipe and the bracket, and further secured with a nut on the underside of the bracket. The brackets are designed to secure the railing to the truck bed. The brackets are placed on top of the side panels running the length of the truck bed, from the truck's cab to its tailgate. Typically four or six brackets would be used, one at each corner of the truck bed and, if desired, one in the middle of each side panel, halfway between the cab and the tailgate. Once the brackets have been installed, pipes of the desired length may easily be installed by threading them through the sleeves at each bracket and securing them with a screw through the pipe, the sleeve and the bracket. Old pipes can simply and inexpensively be replaced and many different railing configurations are possible. Various joints, elbows and T-connectors are available for PVC pipes, allowing one to customize the railing anti easily change the configuration to suit different needs as they arise. It would be possible to build the railing above the side panels of the truck bed in a cage-like arrangement. This system of truck bed rails provides functional bed rails which can be modified or replaced simply and inexpensively.

6 Claims, 2 Drawing Sheets

RAIL SYSTEM FOR PICK-UP TRUCK BEDS

BACKGROUND OF THE INVENTION

The present invention relates to truck bed rails and more particularly to an improved design for protective rails offered in the aftermarket for installation on the beds of pick-up trucks. Applicant's track bed rail system can be readily modified to meet various needs of the truck owner and is less expensive to manufacture, install and maintain than known truck bed rails.

It will be appreciated by those skilled in the art that side railings for the beds of pick-up trucks have been available for a number of years. However, existing bed rail devices are typically expensive to purchase and expensive to install. Existing products of this type are generally decorative in that they are constructed of polished chrome or similar material and are designed to enhance the appearance of the truck. While such systems are useful, when they are installed on working trucks, they are easily damaged and their appearance marred.

Typically truck bed rails are affixed to the tops of the rear side panels of the truck bed, which extend from the cab to the tailgate. Such rails are often made of chrome and are permanently attached to the truck's side panels. The purpose of existing bed rails is both aesthetic, to enhance the truck's appearance, and functional, to provide a means of securing loose cargo placed in the bed of the truck or tarpaulins covering said truck bed.

While existing bed rails do provide a way to tie down tarpaulins and loose cargo, their usefulness is limited. Because, by design, these truck bed rails are fixed and permanent, they cannot easily be modified to accommodate different needs. Also their expense can be prohibitive. A truck bed rail device that is inexpensive, flexible and easily modified is presently unavailable.

SUMMARY OF THE INVENTION

It is the object of the present invention to provide inexpensive and utilitarian truck bed rails in which the apparatus embodies a construction and arrangement of parts made of standard, off-the-shelf PVC pipe secured to the side panels of truck beds with brackets made to mate with the pipe. More particularly, the invention consists of a truck bed railing having a bracket with depending legs with holes in them such that they may be attached to the top of the rear side panel of a truck bed with screws. The top of said bracket has a U-shaped profile to mate with standard PVC pipe. The top of the bracket contains an aperture that is used to secure the pipe and sleeve. The metal sleeve is a hollow cylinder, with a hole through its center, that holds the PVC pipe securely against the upper, U-shaped portion of the bracket. Once the PVC pipe has been threaded through the sleeve, it is anchored with a screw passing through the sleeve, the pipe and the bracket, and further secured with a nut on the underside of the bracket.

The brackets, constructed with a U-shaped profile to mate with standard PVC pipe, are designed to secure the railing to the truck bed. The brackets would be screwed into place on top of the side panels running the length of the truck bed, from the truck's cab to its tailgate. Typically four or six brackets would be used, one at each corner of the truck bed and, if desired, one in the middle of each side panel, halfway between the cab and the tailgate.

Once the brackets have been installed, pipes of the desired length may easily be installed by threading them through the sleeves at each bracket and securing them with a screw through the pipe, the sleeve and the bracket. Old pipes can simply and inexpensively be replaced and many different railing configurations are possible. Various joints, elbows and T-connectors are available for PVC pipes, allowing one to customize the railing and easily change the configuration to suit different needs as they arise. It would be possible to build the railing above the side panels of the truck bed in a cage-like arrangement. This system of truck bed rails provides functional bed rails which can be modified or replaced simply and inexpensively.

DESCRIPTION OF THE PREFERRED EMBODIMENT

Figure 1:
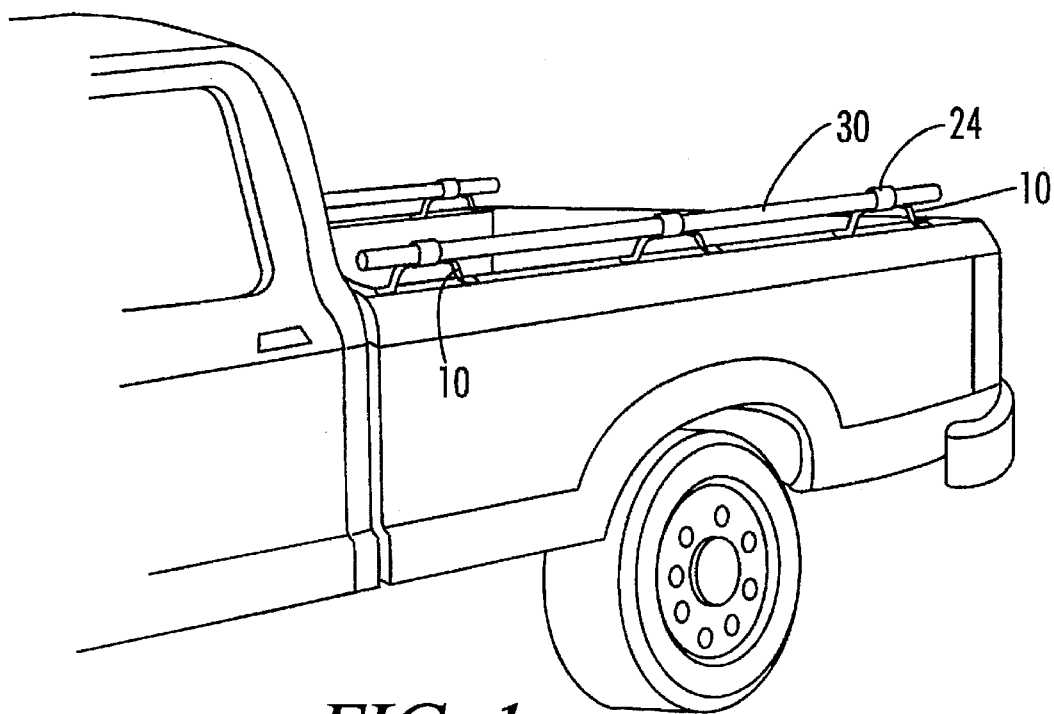
FIG. 1 is a partial perspective view of a pick-up truck with Applicant's rail system installed on the truck bed.

The preferred embodiment of the present invention will be described in conjunction with FIGS. 1-5 of the accompanying drawings wherein like reference numerals refer to like elements of the device. The truck bed rails of the present invention include mounting brackets 10, sleeves 24, and PVC pipe 30. The brackets and sleeves serve as a mounting structure for the rails, and the pipe functions as the rails in Applicant's system.

Figure 3:
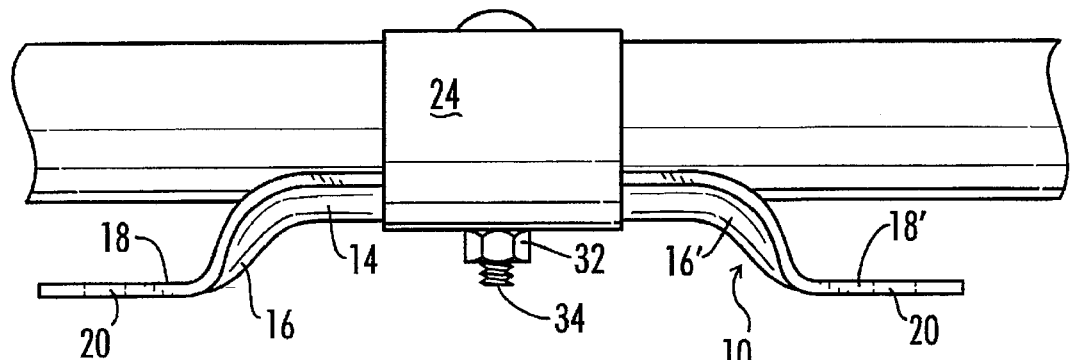
FIG. 3 is a side view of the mounting structure for the rail bed system of Applicant's invention.
Figure 4:
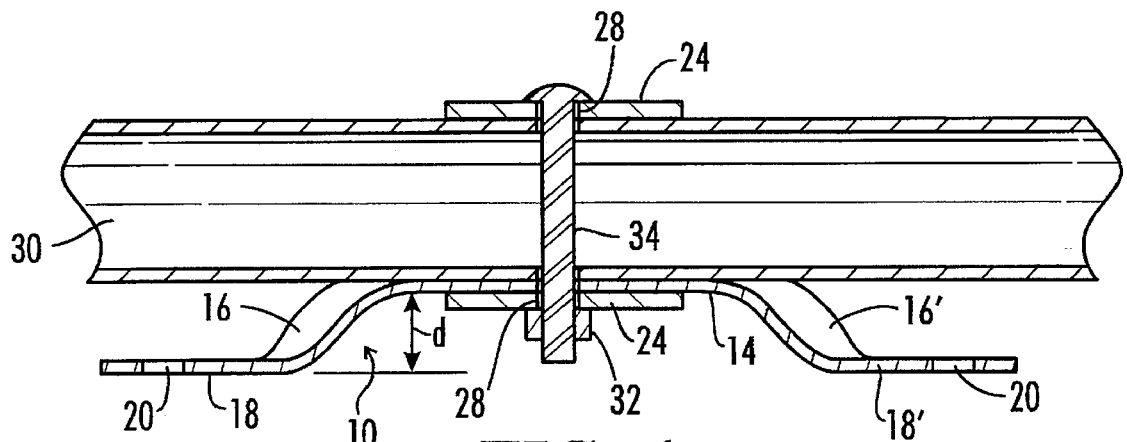
FIG. 4 is a side view in cross section of the mounting structure for Applicant's invention.
Figure 5:
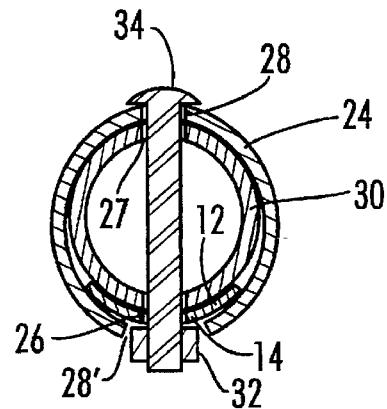
FIG. 5 is an end view in cross section of the mounting structure for Applicant's invention.

As can be best seen from FIGS. 3-5, the brackets 10 each have a center section 14 with a U-shaped profile 12 that is shaped to mate with the outer perimeter of a standard PVC pipe 30. Two depending legs 16, 16' are integrally formed in or attached to the bracket, one at each end of the center section 14. Feet 18, 18' extend from the lower portions of the legs 16, 16' and are flattened into the same plane so that they can be mounted on the side panels of the of the bed of a pick-up truck. Holes 20 are formed in the feet 18, 18' so that when the feet are to placed on the tops of the rear side panels of a truck, the bracket 10 can be attached to truck with screws passing through the holes 20 in the feet.

When the bracket 10 is mounted on the rear side panels of a truck, the legs 16, 16' space the center section 14 of the bracket a distance d from the top of the panel so that when a rail is mounted on the center section 14, the rail will be spaced above the top of the panel. This spacing of the rail from the panel makes it easy to tie-off cargo on the truck and to get to the bottom of the bracket to loosen bolts holding the rail to the bracket in order to change or repair the rail, all in a manner as is discussed in more detail later in this description of the preferred embodiment of Applicant's invention.

The sleeve 24 is a metal cylinder with holes 28 through diametrically opposed locations in its circumference. Alternatively, the sleeve 24 can have a C-shaped cross-sectional profile as is illustrated in FIG. 5 with a hole 28 in the top of the sleeve and a channel 28' along the bottom of the sleeve. In either embodiment, the sleeve 24 will encircle the PVC pipe 30 and the bracket 10, serving to fit them tightly together. When assembled, a bolt 34 will be passed through holes 28 in the sleeve 24, through a hole 27 drilled or otherwise formed in pipe 30, through a hole 26 in the center section 14 of bracket 10 and be clamped beneath bracket 10 by nut 32 threaded onto the end of the bolt, thus securing the PVC pipe 30, the sleeve 24, and the bracket 10 in a fixed relationship.

A number of brackets 10 are spaced about the side panels of the truck and along the panel behind the cab of the truck. Brackets can also be connected to the top of the tailgate of the truck bed so that a rail can be independently mounted on the tailgate as well as on the side panels.

In practice, the brackets 10 can be mounted by screws passing through holes 20 in the top portion of the side panels of the truck. Of course, alternatively, the brackets 10 could be welded or otherwise attached to the top of the side panels of the bed. Brackets may also be attached to the top of the tailgate of the bed. The brackets are positioned so that their U-shaped profile on each panel is in axial alignment. With this alignment, a piece of PVC pipe 30 can be laid on the brackets 10 and the profile of outer perimeter of the PVC pipe will mate with the U-shaped profile of the brackets as can be seen in both FIGS. 1 and 2.

Sleeves 24 are slipped over one end of each bracket 10 before the bracket is mounted to the truck bed so that the sleeve will fit about the center section 14 of the bracket once the bracket is in place.

After the brackets 10 are mounted with the sleeves 24 encircling the center sections 14 of the bracket, the rail system can be completed by sliding PVC pipe 30 through the sleeves 24. Thus, the PVC pipe 30 will rest on the U-shaped profile of the center section 14 and be held into place by the sleeve 24 which encircles both the PVC pipe 30 and the center section 14 of the bracket 24.

The PVC pipe 30 can be fixed into place relative to the bracket 10 by passing a bolt 34 through the holes 28 in the sleeve 24, the holes 27 in the PVC pipe 30, and the hole 26 in the center section 14 of the bracket 10. Of course the holes 26, 27, 28 will be in registry so that the bolt 34 can easily pass through them and be fixed in position by the nut 32 which will be screwed onto the end of the bolt opposite its head. Once the nut 32 is screwed onto the bolt 34, the PVC pipe 30 will be securely locked into place on the side panels (and front panel behind the cab) of the truck.

Prior to passing the bolts 34 through the holes 26, 27 and 28 of the system, the ends of PVC pipe sections 30 can be connected where they meet through the use of standard PVC connectors. For example, if a piece of PVC pipe runs across the truck panel section immediately behind the cab, that PVC pipe will run perpendicular to the portion of pipe threaded through the brackets along the side panels to the truck. At the point where the ends of the PVC pipe meet, great stability can be added to the railing by joining those ends through a standard L fitting. The L fitting can be glued in the traditional manner to the two ends of the PVC pipe which are inserted part way into the cavity of the L.

Figure 2:
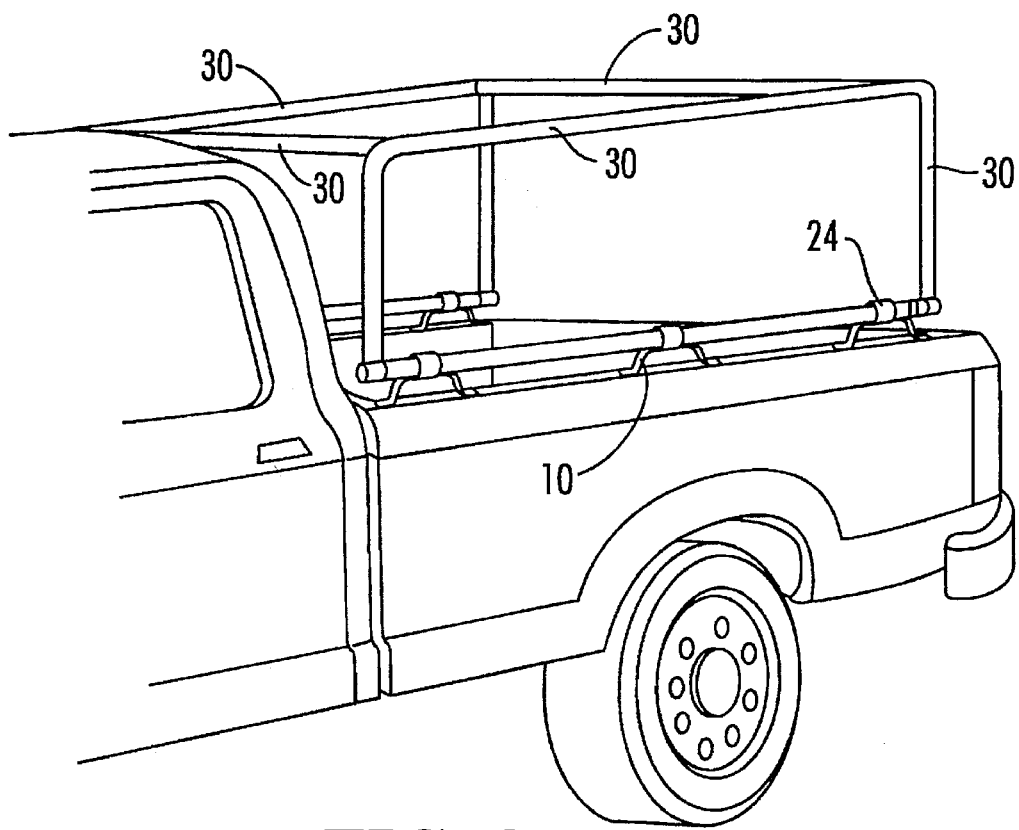
FIG. 2 is a partial perspective view of a pick-up truck with an alternative structure for the rail bed system for Applicant's invention installed.

If a modified rail structure is needed in order to haul ladders or something of that nature, an assembly such as is illustrated in FIG. 2 can be created using standard PVC pipe. In this particular illustration, L-shaped joints can connect the end of the PVC pipe 30 that sits on the side panel to a piece of PVC pipe extending vertically up from that side panel. The PVC pipe extended upwardly can then be connected to a section of pipe parallel to the lower piece as well as a section of pipe extending across the back of the cab. The illustration in FIG. 2 shows one such structure that can be created using standard PVC pipe and standard PVC pipe fittings, all at a minimal time and expense for materials.

For a working truck, the PVC pipe will serve as a protector for the side panels of the pick-up truck, but there will be occasions when loads are thrown onto or crash into the PVC pipe railing which will cause damage to the pipe or which may tend to crush or break it. In those circumstances, the rail can be easily replaced by simply unscrewing the nuts 32 on the bolts 34, removing the PVC pipe from the sleeves 24 and replacing the pipe with another section of inexpensive pipe of standard size and shape.

While the invention contemplates the use of PVC pipe for construction of the rails, galvanized pipe, steel tubing or other standard pipe stock could be used as a substitute. However, PVC pipe is preferred because of the ease in replacing damaged railing and the availability of pipe at a relatively inexpensive cost. Also, the description of the present invention has been directed particularly to the installation of the device on the bed of a pick-up truck. However, the invention could be installed on the top of a van or other vehicle to serve both a protective and cargo tie-down function.

Although there have been described particular embodiments of the present invention of a new and useful rail system for pick-up truck beds, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A truck bed rail system including:
   a. multiple brackets with means for mounting each bracket on a side panel of a truck bed and causing a section of each bracket to be spaced from the panel on which it is mounted;
   b. each bracket having a profile over at least a portion of said section for mating with the profile of the outer perimeter of a section of pipe;
   c. multiple sections of pipe with each section of pipe having an outer perimeter with a profile, said sections of pipe mounted in engaged relationship with said brackets to overly the side panels of a truck bed; and
   d. bolt means for releasably attaching said sections of pipe to said brackets whereby a damaged section of pipe can be removed from said system and replaced with a new section of pipe.

2. The device of claim 1 wherein said pipe sections are polyvinyl chloride pipe material.

3. The device of claim 1 further including pipe fittings and the sections of pipe are connected via the pipe fittings.

4. A truck bed rail system including:
   a. multiple brackets with means for mounting each bracket on a side panel of a truck bed and causing a section of each bracket to be spaced from the panel on which it is mounted;
   b. each bracket having a profile over at least a portion of said section for mating with the profile of the outer perimeter of a section of pipe;
   c. multiple sections of pipe with each section of pipe having an outer perimeter with a profile, said sections of pipe mounted in engaged relationship with said brackets to overly the side panels of a truck bed; and
   d. means for releasably attaching said sections of pipe to said brackets includes sleeves fitted about the sections of said brackets whereby said pipe can be received within said sleeve to hold the sections of pipe in engagement with said brackets, thereby permitting a damaged section of pipe to be removed from said system and replaced with a new section of pipe.

5. The device of claim 4 wherein said bracket, said sections of pipe and said sleeves have holes through them, said holes being in registry whereby a bolt can be passed through them and a nut threaded onto the end of the bolt to securely affix the pipe sleeve and bracket together.

6. A vehicle body protection system including:
 a. multiple brackets with means for mounting each bracket on a portion of a vehicle body and causing a section of each bracket to be spaced from the portion of the vehicle body on which it is mounted;
 b. each bracket having a profile over at least a portion of said section for mating with the profile of the outer perimeter of a section of pipe;
 c. multiple sections of pipe with each section of pipe having an outer perimeter with a profile, said sections of pipe mounted in engaged relationship with said brackets to overly a portion of the vehicle body; and
 d. sleeve means for releasably attaching said sections of pipe to said brackets whereby a damaged section of pipe can be removed from said system and replaced with a new section of pipe.

* * * * *